(12) United States Patent
Spector et al.

(10) Patent No.: US 10,303,037 B2
(45) Date of Patent: May 28, 2019

(54) WIDE ANGLE STEERING WITH PHASE ARRAY WITH WIDE-ELEMENT SPACING AND LENS ARRAY

(71) Applicant: The Charles Stark Draper Laboratory, Inc., Cambridge, MA (US)

(72) Inventors: Steven Spector, Lexington, MA (US); Benjamin Lane, Sherborn, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/617,724

(22) Filed: Jun. 8, 2017

(65) Prior Publication Data

US 2017/0357142 A1 Dec. 14, 2017

Related U.S. Application Data

(60) Provisional application No. 62/349,851, filed on Jun. 14, 2016.

(51) Int. Cl.
*G02F 1/29* (2006.01)
*G02B 7/02* (2006.01)
(Continued)

(52) U.S. Cl.
CPC ............ *G02F 1/292* (2013.01); *G01S 7/4817* (2013.01); *G01S 17/42* (2013.01); *G02B 7/021* (2013.01);
(Continued)

(58) Field of Classification Search
CPC .. G02F 1/292; G02F 1/1326; G02F 1/133528; G02F 1/31; G02F 1/1313;
(Continued)

(56) References Cited

U.S. PATENT DOCUMENTS 5,059,008 A 10/1991 Flood
5,392,157 A 2/1995 Shih
(Continued)

FOREIGN PATENT DOCUMENTS

EP 2 290 993 A1 3/2011

OTHER PUBLICATIONS

Kevin Flood et al., Continuous wide-angle beam steering using translation of binary microlens arrays and a liqiud-crystal phased array, May 1, 1990, Intelligent Robots and Computer Vision XXXI: Algorithms and Techniques, vol. 1211, pp. 296-304.*
(Continued)

*Primary Examiner* — Brandi N Thomas
(74) *Attorney, Agent, or Firm* — HoustonHogle LLP

(57) ABSTRACT

An optical beam steering system comprises an array of optical elements for generating or detecting optical signals, a coarse beam steering system for steering a beam between grating lobes, and a fine beam steering system for steering the beam within a grating lobe imposed by the coarse beam steering system. It can be applied the problem of providing an optical phased array system that has both a wide range of steering angles and good angular resolution with a reasonable number of array elements. By moving the lens array or controlling a liquid crystal cell, power is steered into different grating lobes. Adding a phase shifter for controlling the relative phase of the optical signals corresponding to the optical elements enables steering within the selected lobe.

13 Claims, 9 Drawing Sheets

(51) Int. Cl.
*G02B 27/30* (2006.01)
*G02B 27/00* (2006.01)
*G01S 17/42* (2006.01)
*G01S 7/481* (2006.01)
*G02B 26/08* (2006.01)
*G01S 17/66* (2006.01)

(52) U.S. Cl.
CPC ..... *G02B 26/0875* (2013.01); *G02B 27/0087* (2013.01); *G02B 27/30* (2013.01); *G01S 17/66* (2013.01)

(58) Field of Classification Search
CPC .... G02F 1/13363; G02F 2203/24; G02F 1/29; G02F 2001/294; G02F 2201/305; G02F 1/0136; G02F 1/133; G02F 2001/13355; G02F 2201/06; G02F 2201/122; G02F 2201/307; G02F 2203/48
USPC ....... 359/237, 245, 253, 290–292, 298, 315, 359/321, 322
See application file for complete search history.

(56) References Cited

U.S. PATENT DOCUMENTS

| | | | |
|---|---|---|---|
| 5,943,159 A | 8/1999 | Zhu | |
| 6,128,421 A | 10/2000 | Roberts | |
| 6,133,687 A * | 10/2000 | Clarke | G02B 3/0037 313/478 |
| 7,298,555 B2 | 11/2007 | Capps | |
| 2007/0146473 A1* | 6/2007 | Masuda | B41J 2/471 347/246 |
| 2009/0034042 A1 | 2/2009 | Tholl et al. | |
| 2011/0222814 A1 | 9/2011 | Krill et al. | |
| 2012/0188467 A1 | 7/2012 | Escuti et al. | |
| 2016/0170287 A1 | 6/2016 | Bitauld et al. | |

OTHER PUBLICATIONS

McManamon, P., "An Overview of Optical Phased Array Technology and Status," Proceedings of SPIE, vol. 5947, 2005. Ten pages.

Flood, K. et al., "Continuous Wide Angle Beam Steering Using Translation of Binary Microlens Array and a Liquid Crystal Phased Array," SPIE vol. 1211 Computer and Optically Formed Holographic Optics, 1990, pp. 296-304. Nine pages.

Heck, M.J.R., "Highly Integrated Optical Phased Arrays: Photonic Integrated Circuits for Optical Beam Shaping and Beam Steering," Nanophotonics vol. 6, No. 1, 2017, pp. 93-107. Fifteen pages.

McManamon, P.F. et al., "A Review of Phased Array Steering for Narrow-Band Electrooptical Systems," Proceedings of the IEEE, vol. 97, No. 6, Jun. 2009, pp. 1078-1096. Nineteen pages.

Flood, K. et al., "Continuous Wide-Angle Beam Steering Using Translation of Binary Microlens Arrays and a Liquid-Crystal Phased Array," Proceedings of SPIE, vol. 1211, 1990, pp. 296-304. Ten pages.

International Search Report and the Written Opinion of the International Searching Authority, dated Oct. 9, 2017, from International Application No. PCT/US2017/036573, filed on Jun. 8, 2017. Seventeen pages.

Tholl, H.D., "Novel Laser Beam Steering Techniques," Proceedings of SPIE vol. 6397, Sep. 28, 2006, pp. 639708-1-639708-14. Fourteen pages.

International Preliminary Report on Patentability, dated Dec. 27, 2018, from International Application No. PCT/US2017/036573, filed on Jun. 8, 2017. 10 pages.

* cited by examiner

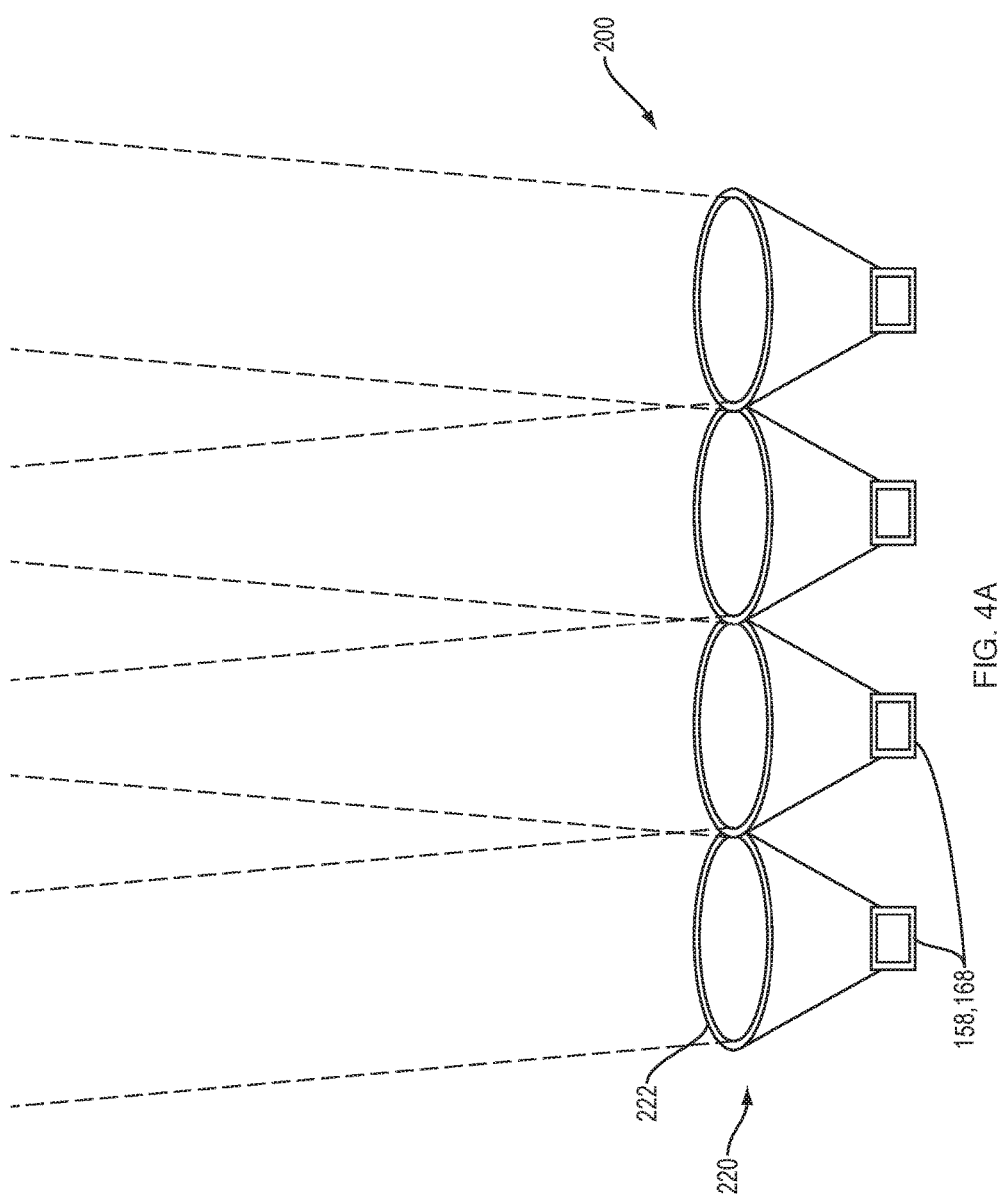

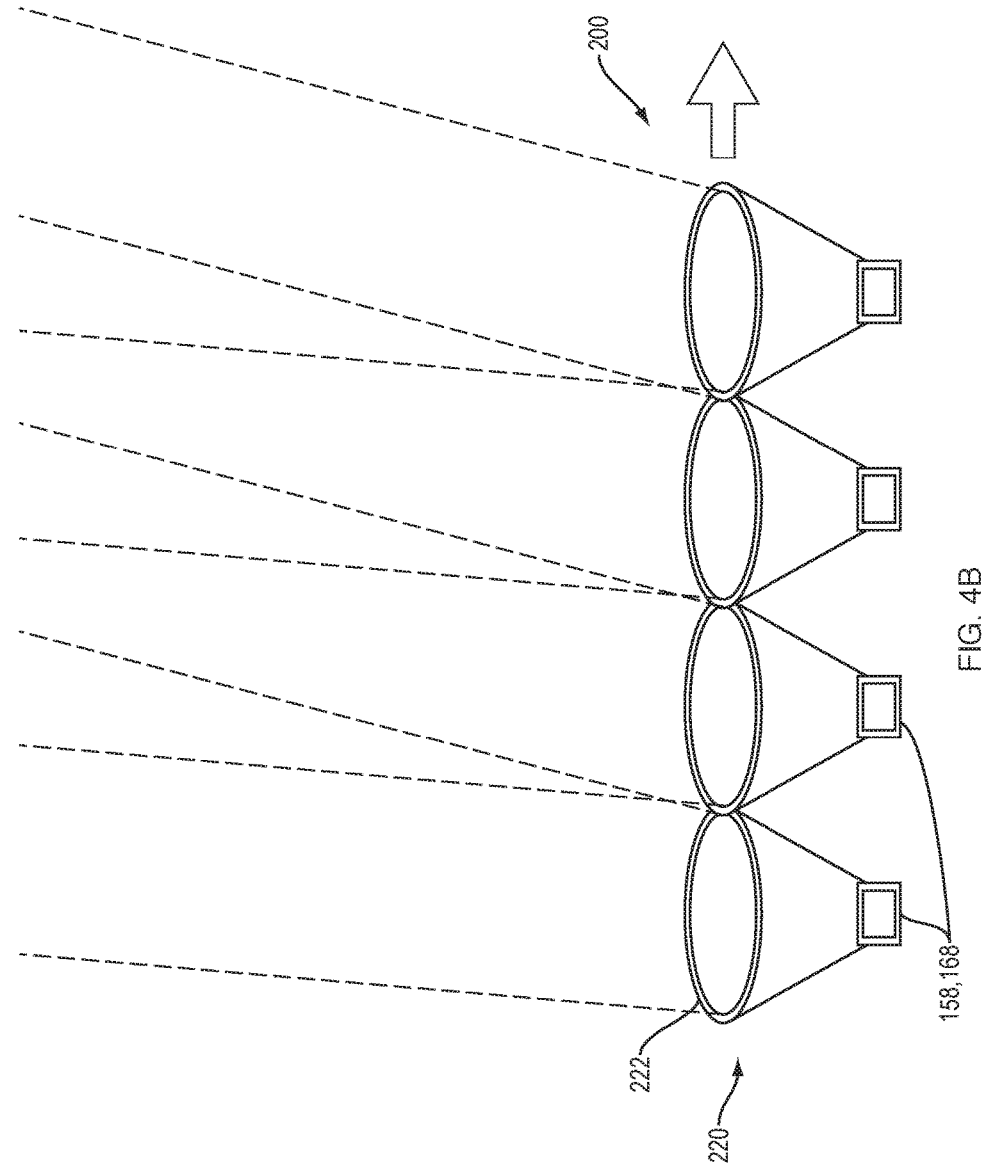

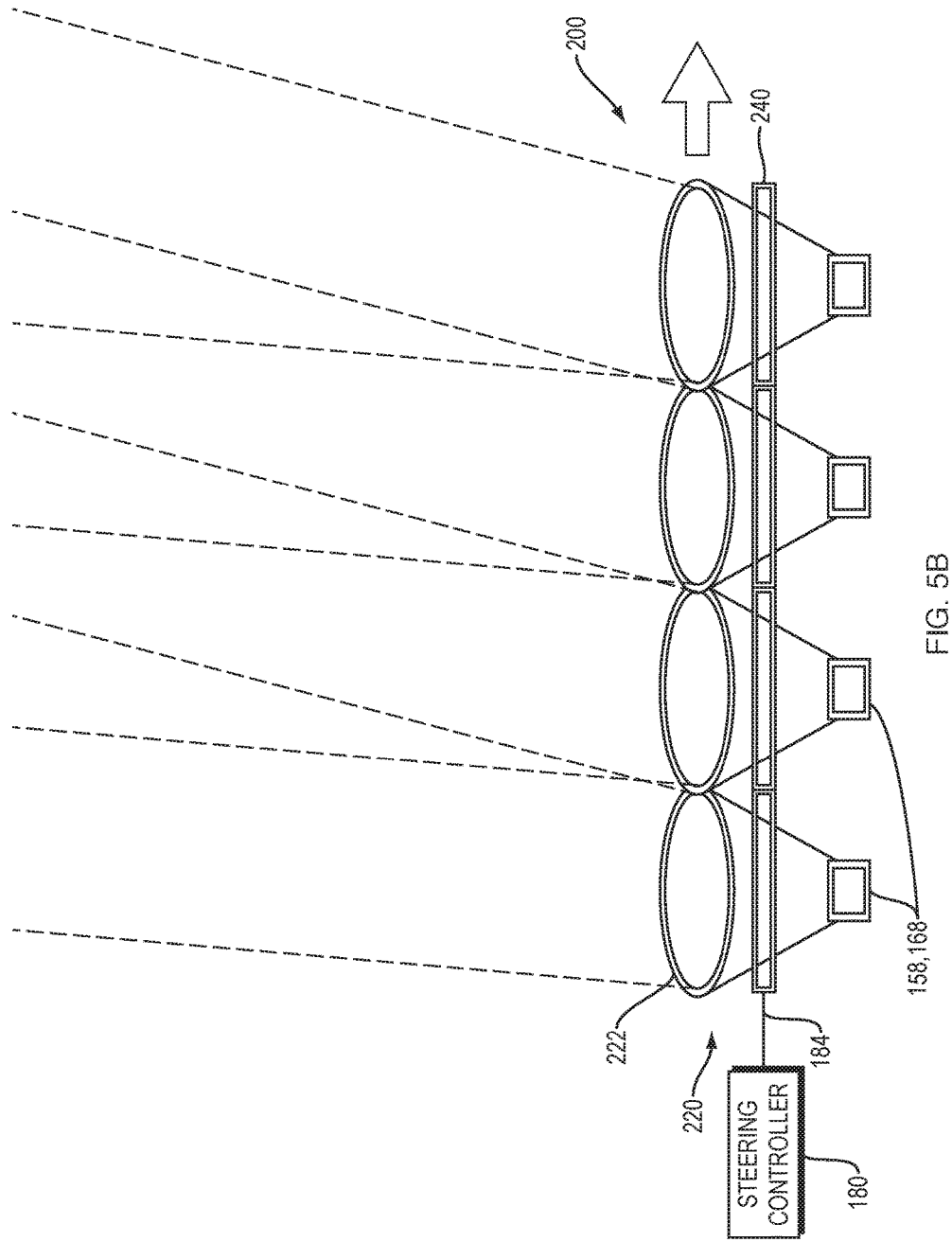

WIDE ANGLE STEERING WITH PHASE ARRAY WITH WIDE-ELEMENT SPACING AND LENS ARRAY

RELATED APPLICATIONS

This application claims the benefit under 35 USC 119(e) of U.S. Provisional Application No. 62/349,851, filed on Jun. 14, 2016, which is incorporated herein by reference in its entirety.

BACKGROUND OF THE INVENTION

Phased array transmitters are composed of a typically regular two-dimensional array of radiating or transmission elements. Each of these elements typically has an associated phase shifter. Beams are formed by shifting the phase of the signal emitted by each of the radiating elements. The result is constructive and destructive interference in the far field that enable the steering of the beam.

The same principle can be applied to phased array receivers. Similarly, a two-dimensional array of antenna or detection elements receives the incoming radiation. Their corresponding phase shifters shift the relative phase of the signals from each of the detection elements in order to create the constructive interference based on the incoming signal's angle of incidence on the receiver.

Traditionally, phased array systems have been common in RADAR systems. These systems operate in the radio frequency regime, in the MegaHertz to GigaHertz frequencies. More recently, optical phased array systems are being proposed and built.

Two common applications for optical phased array systems are communication and LiDAR. Phased array transmitters in optical communications systems enable the optical beam, encoding the desired information, to be steered toward and track the receiver. At the same time, a phased array receiver can direct the gain at the desired optical signal. Such systems can be used for the secure transmission of information with lower power requirements. On the other hand, LIDAR (light radar) is typically a surveying or tracking method that measures the distance to a target with laser light by measuring the reflected pulses. The key advantage to using phased array transmitters and receivers in both of these applications is that the optical signal can be scanned very quickly and precisely, electronically.

One characteristic of phased array antenna systems is the generation of unwanted grating lobes. These are caused by the how the optical signal spreads out from the transmitter elements, and creates constructive interference at angles other than the desired path. A similar process occurs in receivers.

The amplitude of the grating lobes is significantly affected by pitch size, i.e., spacing, between the radiation/detection elements, the number of radiating/detection elements, frequency operation, and bandwidth. In general, grating lobes will occur whenever the pitch size is equal to or greater than the wavelength, and there will be no grating lobes when pitch size is smaller than half a wavelength. The lobes are also affected by steering angle.

SUMMARY OF THE INVENTION

There are a couple of parameters that dictate phased array system performance. In general, to get good angular resolution a large aperture is necessary. To enable a large range of steering angles, close spacing of array elements is necessary. If both a large range of steering angles and good angular resolution is desired in a system operating in the optical regime, then a very large number (perhaps millions or more) array elements are necessary. The power requirements for such an array, would be prohibitive, however, for most applications since the tuning power of a few milliWatts is typically needed for each element. Additionally, each array element requires components, such as phase shifters, and the size of these components limits the ability to closely place array elements.

The invention can be applied the problem of providing an optical phased array system that has both a wide range of steering angles and good angular resolution with a reasonable number of array elements. The invention combines a lens array system in conjunction with an array of optical elements with a large element pitch size. Wide element spacings are generally problematic because multiple beams (grating lobes) are created. The lens array is used to focus all the power into a single grating lobe. By moving the lens array or controlling a liquid crystal cell, power is steered into different grating lobes. Adding a phase shifter for controlling the relative phase of the optical signals corresponding to the optical elements enables steering within the selected lobe.

In general, according to one aspect, the invention features, an optical beam steering system. The system comprises an array of optical elements for generating or detecting optical signals, a coarse beam steering system for steering a beam between grating lobes, and a fine beam steering system for steering the beam within a grating lobe imposed by the coarse beam steering system.

In one embodiment, the coarse beam steering system comprises a lens array system and a translation stage for moving the lens array system relative to the array of optical elements to steer the beam between the different grating lobes.

In another embodiment, the coarse beam steering system comprises a lens array system and liquid crystal cell. A phase ramp is applied to the cell to steer the beam between the different grating lobes.

In some embodiments, the lens array system comprises a series of lens arrays with at least two or three lens for each of the optical elements. The coarse beam steering system might then comprise a translation stage for moving two of the three lens for each optical element of the lens array system relative to the array of optical elements to steer the beam between the different grating lobes.

In each of the embodiments, the fine beam steering system comprises a phased array controller for controlling the relative phase of the optical signals corresponding to the optical elements.

In order to provide a reasonably sized array, a pitch size of the optical elements in the array is greater than a wavelength of operation of the system. Often, the pitch size is greater than 10 times a wavelength of operation of the system.

In general, according to another aspect, the invention features an optical beam steering method. The method comprises generating or detecting optical signals with an array of optical elements, a beam between grating lobes with a coarse beam steering system, and steering the beam within a grating lobe imposed by the coarse beam steering system with a fine beam steering system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 4A and 4B are partial views of the phased array and lens array showing the coarse beam steering between the grating lobes;

FIGS. 5A and 5B are partial views of the phased array, liquid crystal cell, and lens array of a second embodiment.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
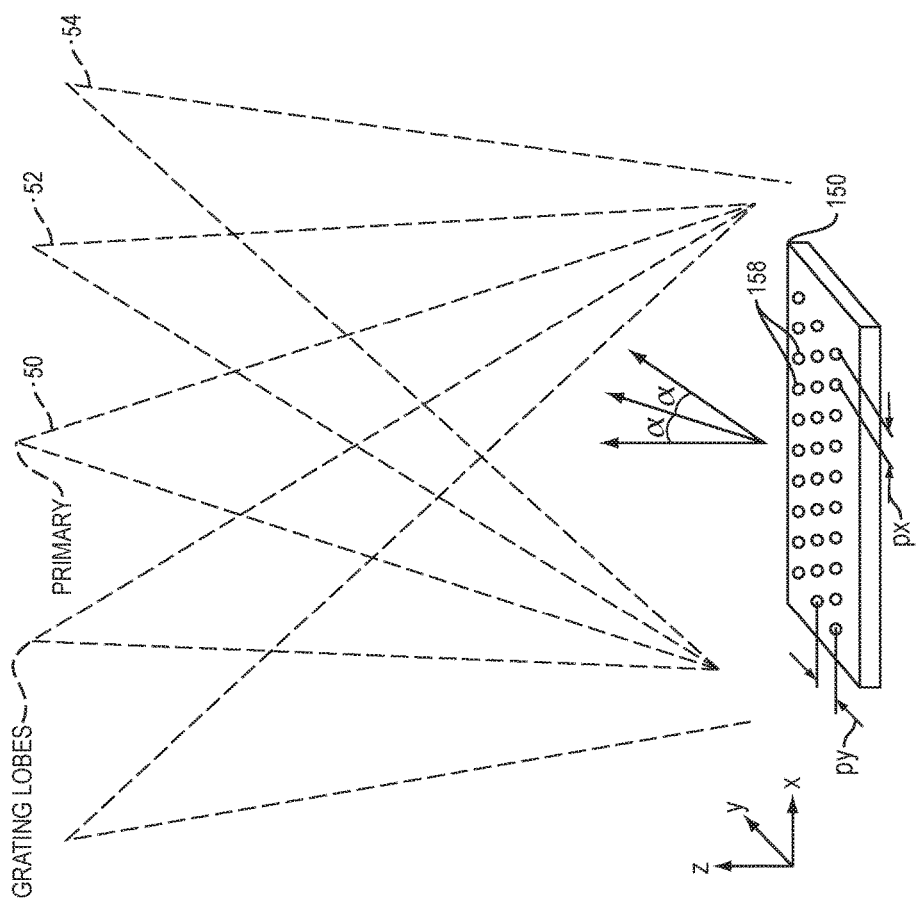
FIG. 1A is a schematic perspective view showing the transmission pattern of a phased array transmitter with a large pitch size of the transmission elements.

FIG. 1A shows a transmitter phased array 150. It includes a two dimensional array of optical transmission elements 158.

A phased array 150 with a large pitch size ($p_x$, $p_y$) between the array transmission elements 158 will project a large number of strong gratings lobes 50, 52, 56. Generally, the lobes include the primary or center lobe 50, and side lobes 52, 54 of increasing order. A separation angle, $\alpha$, characterizes the angular separation between the lobes 50, 52, 56.

As a general rule, these grating lobes arise when the pitch size ($p_x$, $p_y$), i.e., distance between adjacent transmission elements along the x and y axes, is greater than the wavelength of operation.

Figure 1B:
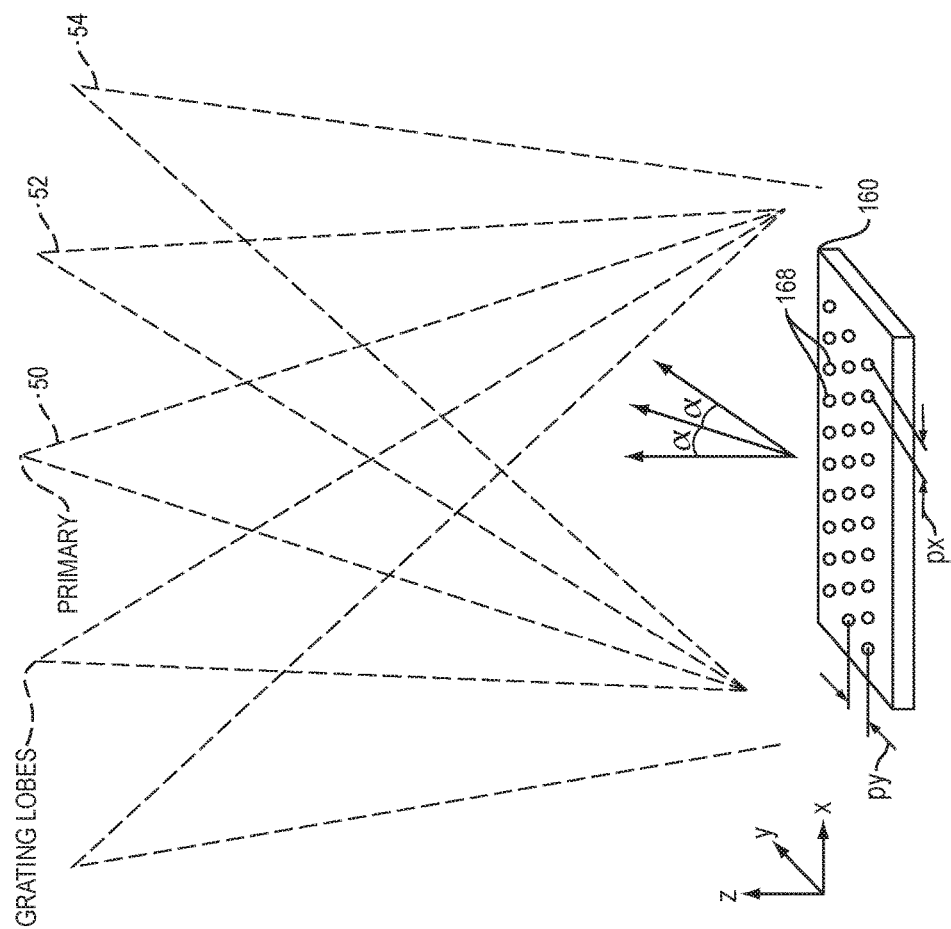
FIG. 1B is a schematic perspective view showing the receive pattern of a phased array receiver with a large pitch size of the detection elements.

FIG. 1B shows a receiver phased array 160. It includes a two dimensional array of optical detection elements 168.

Here again, when the phased array 160 has a large pitch size ($p_x$, $p_y$) between the array detection elements 168, there will be a large number of strong gratings lobes 50, 52, 56 in the array's receive pattern.

Figure 2:
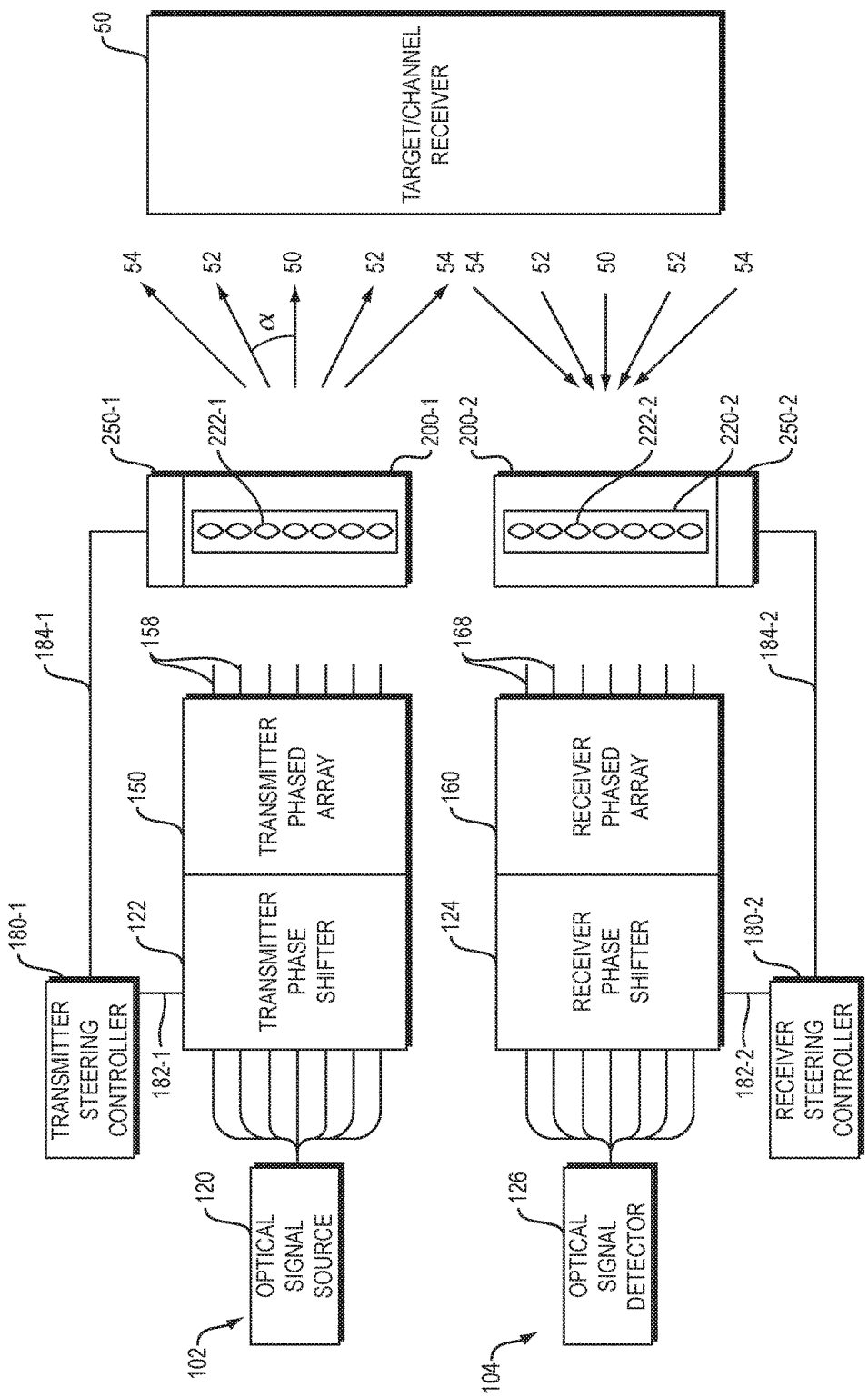
FIG. 2 is a block diagram of a phased array system according to the present invention.

FIG. 2 shows a phased array system according to the present invention. The illustrated example might be applied to a LiDAR or communications system, to list two exemplary applications.

In more detail, a transmitter 102 includes an optical signal source 120 that generates an optical signal in the infrared, visible, or ultraviolet wavelengths. Often, the optical signal source 120 is a laser with a generally long coherence length. In the case of a communications system, the optical signal source 120 may further include a modulator for modulating the optical signal to encode information for transmission. In the case of a LiDAR system, the optical signal source is often a pulsed laser source or a modulated light source.

The coherent light generated by the optical signal source 120 divided into separate optical signals and provided to a fine beam steering transmitter phase shifting array 122. In general, the fine beam steering phase shifting array 122 shifts the phase of the optical signals to steer the beam over a range of angles that is at least as large as the angular separation, $\alpha$, between the grating lobes 50, 52, 54.

The optical signals from the phase shifting array 122 are then provided to the transmitter phased array 150. It includes a two dimensional array of optical transmission elements 158. In the illustrated example, the transmitter phased array 150 of optical transmission elements 158 comprises a two dimensional, regular array of optical transmission elements 158.

According to the invention, the large pitch size ($p_x$, $p_y$) between the array transmission elements 158 is large. It is greater than the wavelength of operation of the system. In fact, the pitch size ($p_x$, $p_y$) between the transmission elements 158 is preferably, greater than 5 times and are usually greater than 10 times the wavelength of operation of the system in order to ensure a reasonably small number transmission elements 158 in the phased array 150, and concomitantly lower power requirements. For example, if the wavelength of operation is between 400 and 2000 nanometers, then both $p_x$, $p_y$ are greater than 400 to 2000 nanometer and are preferably greater than 2-80 micrometers. In a more specific example, if the wavelength of operation is 1500 nanometers, then both $p_x$, $p_y$ are greater than 1500 nanometer and are preferably greater than 7.5 or greater than 15 micrometers.

As a result, the transmitter 102 will project a large number of strong gratings lobes 50, 52, 56. Generally, the lobes include the primary or center lobe 50, and side lobes 52, 54 of increasing order. A separation angle, $\alpha$, characterizes the angular separation between the lobes 50, 52, 56.

The transmission elements 158 emit optical signals, each with a defined phase shift relative to the others provided by the fine beam steering transmitter phase shifting array 122. This allows the beam to be steered, albeit over a relatively small angular range, under the control of the transmitter steering controller 180-1. The angular range is usually less than 2 α and can be about 1.2 (α) so that there is sufficient overlap for smoothing tracking.

A transmitter coarse steering system 200-1 steers the beam between (to different) grating lobes. It includes a lens array system 220-1 that comprises individual lenses or lens trains 222 extending in a planar, two dimensional array. Each lens or lens train correspond to one of the transmission elements 158. Each of the lenses 222 of the transmitter lens array system 220 collects light emitted by the corresponding transmission element 158 and collimates the light. The lens array system 220 addresses the problem of the grating lobes created by the large pitch size in the phased array 150. The lenses 222 of the lens array system 220 focus the power into a single one of the grating lobes at any given time.

The generated beam can then transmitted to a target or through a transmission channel 50.

In the illustrated example, the light is then received by a receiver 104.

It should be noted that the present system also applies to the configuration in which the same element array functions both as the transmitter and the receiver. This could be done using a passive element (such as isolator, or 3 dB coupler) or an active switch that is fast enough to switch between transmit and receive (Or a combination of passive and active elements).

In any event, in the illustrated example, a receiver coarse steering system 200-2 steers the receive pattern to track the target or maintain the link to the transmitter 102 over the channel, depending on the application. The receiver coarse steering system 200-2 includes a lens array system 220-2 that also comprises individual lens or lens trains 222. These lenses correspond to each of the detection elements 168 of the receiver phased array 160. Each of the lenses 222 of the receiver lens array system 220 collects light received from one of the grating lobes of the receive pattern and focuses the light to its respective detection element 168.

The detection elements 168 of a receiver phased array 160 collect the light from the coarse steering system and provide the light to a receiver phase shifter 124. It applies a phase shift to the feed from each one of the detection elements 168 and then combines the optical signals for detection and possibly demodulation by an optical signal detector 126.

According to the invention, the large pitch size ($p_x$, $p_y$) between the array detection elements 168 is large. It is greater than the wavelength of operation of the system. In fact, the pitch size is preferably greater than 5 times and is usually greater than 10 times the wavelength of operation of the system in order to ensure a reasonably small number detection elements 168 in the phased array 160. For example, if the wavelength of operation is 1500 nanometer, then both $p_x$, $p_y$ between the detection elements 168 of the receiver phased array 160 are greater than 1500 nanometer and are preferably greater than 7.5 and often greater than 15 micrometers.

As a result, the receiver 104 will have a large number of strong gratings lobes 50, 52, 56 in its receive pattern. Generally, the lobes include the primary or center lobe 50, and side lobes 52, 54 of increasing order. A separation angle, α, characterizes the angular separation between the lobes 50, 52, 56.

According to the invention, steering controllers 180-1, 180-2 are provided for each of the transmitter 102 and the receiver 104. These steering controllers 180-1, 180-2 each generate both a coarse steering signal 184 and a fine steering signal 182. The coarse steering signals 184-1, 184-2 are provided to respective the coarse steering systems 200-1, 200-2, which steer the beam among the different grating lobes 50, 52, 54. In order to guide the beam to the target or over the channel 50.

The fine steering signals 182-1, 182-2 that are provided to the transmitter phase shifter 122 and the receiver phase shifter 124. The fine steering control is used to guide the beam within the grating lobe selected by the coarse steering signal.

It should be understood that in the previous description, the invention is described as being applied to both the receiver and transmitter in a system or a system that combines both functions into one array. In other implementations, however, the invention might be used in only the transmitter or only the receiver, depending on the technical requirements.

Figure 3:
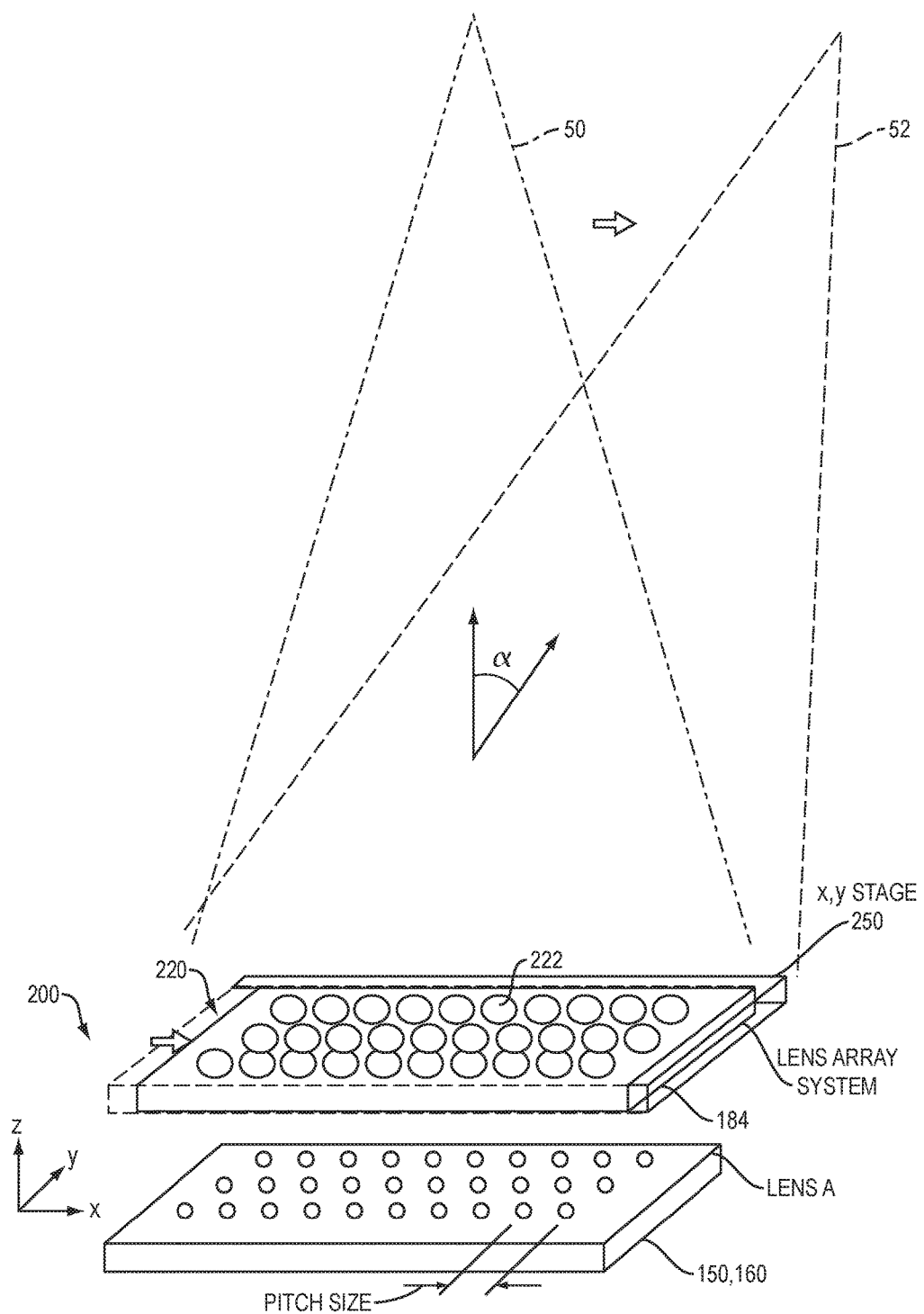
FIG. 3 is a schematic perspective view of the coarse steering system according to a first embodiment.

FIG. 3 shows the coarse steering system 200 according to a first embodiment. This coarse steering system could be used in either the transmitter 102 or receiver 104, or both.

In this example, the coarse steering signal 184 from the steering controller 180 is provided to a x, y, stage 250 that shifts the lens array 220 in the x, y plane relative to the phased array 150, 160. As shown, this movement of the lens array 220 has the effect of shifting the beam into one of the grating lobes 50, 52. In the illustrated example, the beam is shown being shifted between the primary lobe 50 and the first order grating lobe 52.

In the illustrated enable, the phased array 150, 160 is shown as a 3 by 10 array. In typical applications, the array will have at least 8 rows and 8 columns. Good performance could be obtained with a 32 by 32 array and 100 rows by 100 columns or more are other options.

FIGS. 4A and 4B are partial views of the phased array 150, 160 and lens array 220 showing the coarse beam steering between the grating lobes. Specifically, when the lens array 220 is shifted along the x and y axes by the x, y stage 250, and specifically to the right as shown between the figures, the transmission or receive pattern shifts/jumps to an adjacent grating lobe.

These figures also expose a challenge associated with this design. It can suffer from "crossillumination" as the lens array 220 is moved, each lens 222 starts to catch light from the wrong phased array element 158, 168. This light goes in the wrong direction, illuminating some of the other orders.

For some applications, where one only needs to steer a few orders, this is probably acceptable. There are other design trade-offs, however. If the design does not illuminate the entire lens, more scanning is possible before crossillumination occurs. However, filling less of the lens gives less selectivity of the desired order. That is, less extinction of the unwanted orders.

Figure 5A:
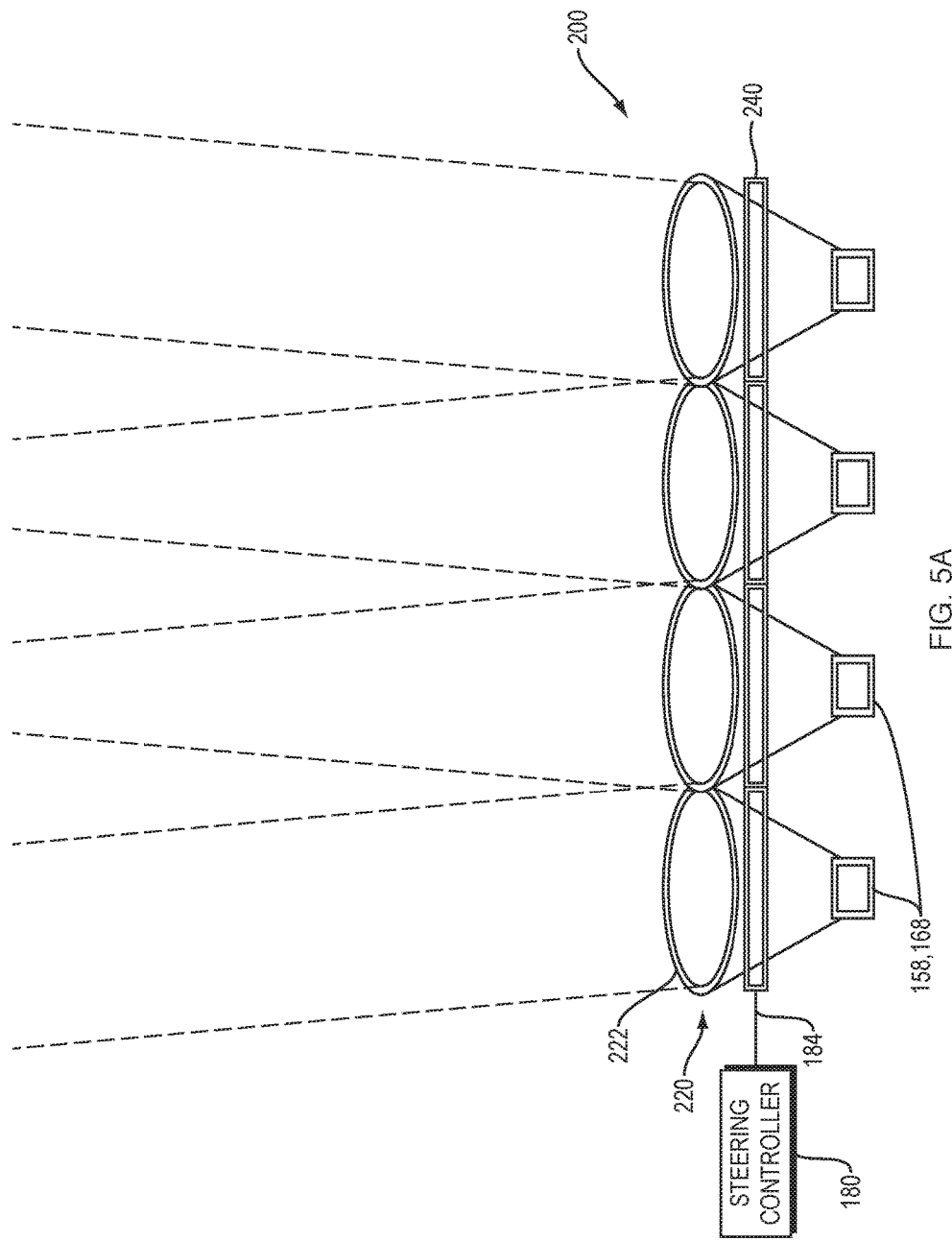

FIGS. 5A and 5B are partial views of the phased array 150, 160 and lens array 220 showing the coarse beam steering according to another embodiment.

In this example, a liquid crystal cell 240 is located between lens array 220 and the phased array 150, 160. The coarse beam steering signal 184 controls the liquid crystal cell 240 to apply a phase ramp across the extent of the phased array 150, 160 to shift the transmission or receive pattern between grating lobes.

Specifically, in response to the coarse steering signal 184, the liquid crystal cell 240 applies a phase ramp to shift the transmission or receive pattern to an adjacent grating lobe. By creating an index gradient across the liquid crystal cell 240, it acts as a tunable prism, steering the light. The advantage to the LC technique are the lack of moving parts, and the lack of cross-illumination.

Figure 6:
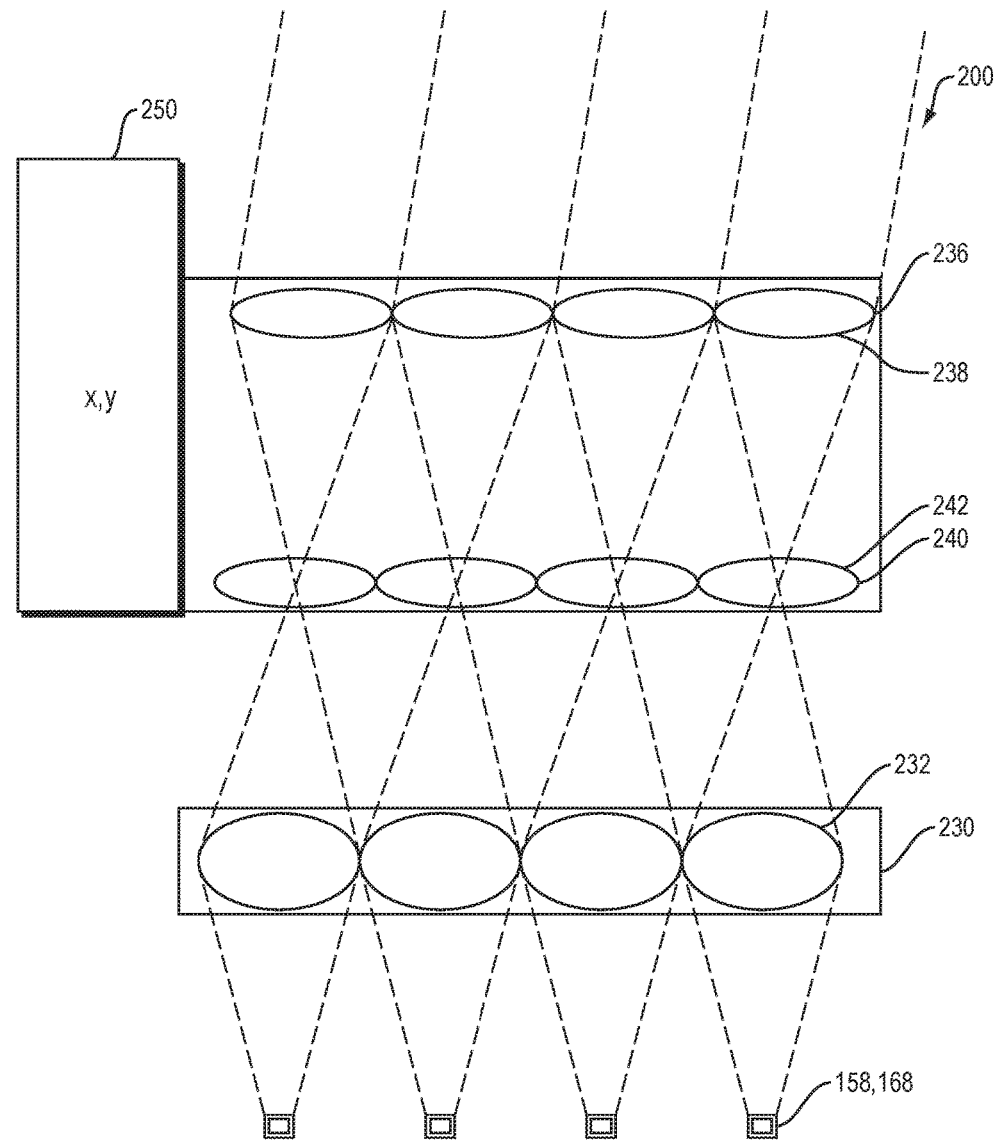
FIG. 6 is a partial view of the phased array and lens array system of a third embodiment.

FIG. 6 are partial views of the phased array 150, 160 and lens array system 220 showing the coarse beam steering system 220 according to a third embodiment. This embodiment, with its extra lens arrays, better avoids cross illumination.

Here, a series of lens arrays 230, 240, 236 are used to refocus and coarsely steer.

Starting with the example of a transmitter, the lenses 232 of the first lens array 230 focus the light from the transmission elements 158 to a set of spots, incident on the lens 242 of the second array 240. The second array 240 diverts the path of the light. A third lens array 236 collimates the light.

The x, y stage 250 moves the second lens array 240 and the third lens array 236 in unison to steer the beam. The first lens array 230 is stationary relative to the phased array 150.

In the example of a receiver, the third lens array 236 receives the incoming light. Its lenses 238 focus the light to spots in the lenses 240 of the second lens array 242. The first lens array 230 the focuses the light onto the corresponding detection element 168. Here, the x, y stage 250 moves the second lens array 240 and the third lens array 236 in unison to steer the receive pattern.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical beam steering system, comprising:
   an array of optical elements for generating or detecting optical signals, wherein the array is a 32 by 32 array or larger;
   a coarse beam steering system for steering a beam between grating lobes, the coarse beam steering system including a first lens array, a second lens array and a third lens array, with lens in each of the first lens array, the second lens array and the third lens array for each of the optical elements and a translation stage for moving the second lens array and the third lens array relative to the array of optical elements to steer the beam between the different grating lobes, wherein the translation stage moves the second lens array and the third lens array in unison to steer the beam and the first lens array is stationary relative to the array of optical elements; and
   a fine beam steering system for steering the beam within a grating lobe imposed by the coarse beam steering system.

2. A system as claimed in claim 1, wherein the coarse beam steering system further comprises a liquid crystal cell.

3. A system as claimed in claim 2, wherein the liquid crystal cell provides a phase ramp across the array to steer the beam between the different grating lobes.

4. A system as claimed in claim 1, wherein the fine beam steering system comprises a phased array controller for controlling the relative phase of the optical signals corresponding to the optical elements.

5. A system as claimed in claim 1, wherein a pitch size of the optical elements in the array is greater than a wavelength of operation of the system.

6. A system as claimed in claim 1, wherein a pitch size of the optical elements in the array is greater than 10 times a wavelength of operation of the system.

7. An optical beam steering method, comprising:
   generating or detecting optical signals with an array of optical elements, wherein the array is a 32 by 32 array or larger;
   steering a beam between grating lobes with a coarse beam steering system, the coarse beam steering system including a first lens array, a second lens array and a third lens array, with lens in each of the first lens array, the second lens array and the third lens array for each of the optical elements and a translation stage for moving the second lens array and the third lens array relative to the array of optical elements to steer the beam between the different grating lobes, wherein the translation stage moves the second lens array and the third lens array in unison to steer the beam and the first lens array is stationary relative to the array of optical elements; and
   steering the beam within a grating lobe imposed by the coarse beam steering system with a fine beam steering system.

8. A method as claimed in claim 7, wherein the coarse beam steering system further comprises a liquid crystal cell.

9. A method as claimed in claim 8, further comprising applying a phase ramp to the liquid crystal cell to steer the beam between the different grating lobes.

10. A method as claimed in claim 7, further comprising controlling the relative phase of the optical signals corresponding to the optical elements.

11. A method as claimed in claim 7, wherein a pitch size of the optical elements in the array is greater than a wavelength of operation of the system.

12. A method as claimed in claim 7, wherein a pitch size of the optical elements in the array is greater than 10 times a wavelength of operation of the system.

13. A system as claimed in claim 1, wherein the coarse beam steering system further comprises liquid crystal cell, wherein the liquid crystal cell provides a phase ramp across the array to steer the beam between the different grating lobes and the fine beam steering system comprises a phased array controller for controlling the relative phase of the optical signals corresponding to the optical elements.

* * * * *